May 19, 1959 H. B. LADNER 2,887,235
CARGO HANDLING ASSEMBLY
Filed Feb. 1, 1956 4 Sheets-Sheet 1

INVENTOR.
HILTON BRUCE LADNER
BY Victor J. Evans & Co.
ATTORNEYS

May 19, 1959

H. B. LADNER 2,887,235

CARGO HANDLING ASSEMBLY

Filed Feb. 1, 1956

INVENTOR.

HILTON BRUCE LADNER

BY *Victor J. Evans & Co.*

ATTORNEYS

May 19, 1959

H. B. LADNER 2,887,235

CARGO HANDLING ASSEMBLY

Filed Feb. 1, 1956

INVENTOR.

HILTON BRUCE LADNER

BY *Victor J. Evans & Co.*

ATTORNEYS

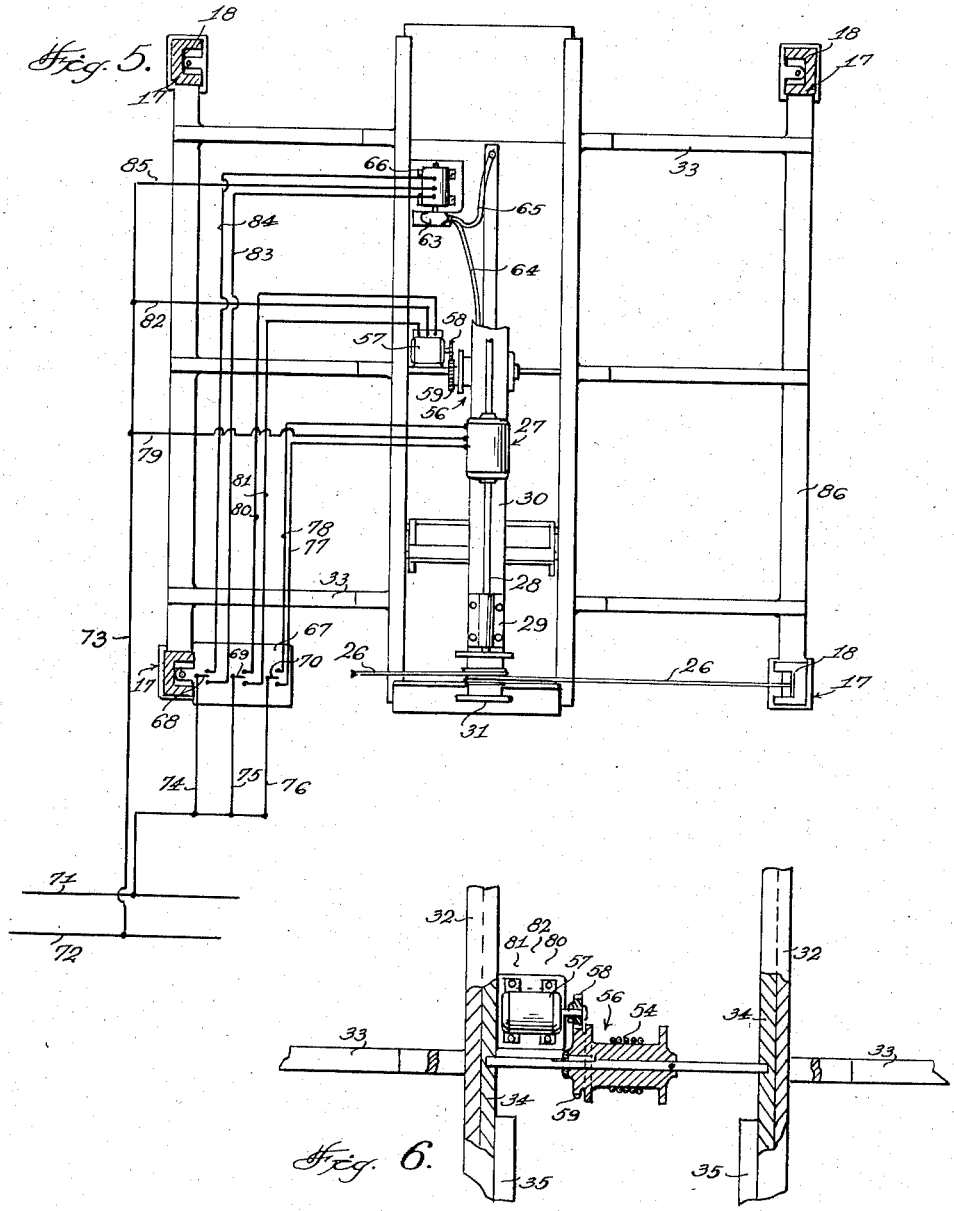

United States Patent Office 2,887,235
Patented May 19, 1959

2,887,235

CARGO HANDLING ASSEMBLY

Hilton Bruce Ladner, Galveston, Tex.

Application February 1, 1956, Serial No. 562,828

4 Claims. (Cl. 212—15)

This invention relates to a material handling assembly, and more particularly to an apparatus for use in loading or unloading cargoes for ships.

The object of the invention is to provide a cargo handling apparatus which includes movable roofs which can be extended to protect cargoes and personnel from adverse weather conditions whereby loading and unloading of ships can be accomplished even in bad weather.

Another object of the invention is to provide an apparatus for use on wharves or piers whereby cargoes can be loaded into or out of ships regardless of the size of the ship, and wherein protection is afforded to the persons working on the cargo as well as to the cargo so that the personnel and cargo will not be damaged by rain, snow, or other inclement weather.

A further object of the invention is to provide an adjustable cargo handling assembly which is extremely simple and inexpensive to manufacture.

Other objects and advantages will be apparent during the course of the following description.

In the accompanying drawings, forming a part of this application, and in which like numerals are used to designate like parts throughout the same:

Figure 5 is a schematic illustration of the wiring diagram for the present invention.

Figure 6 is a sectional view taken on the line 6—6 of Figure 1.

Figure 7 is a fragmentary elevational view, with parts broken away and in section, showing one of the wheels on the bottom of a beam which engages a track or rail.

Figure 1:
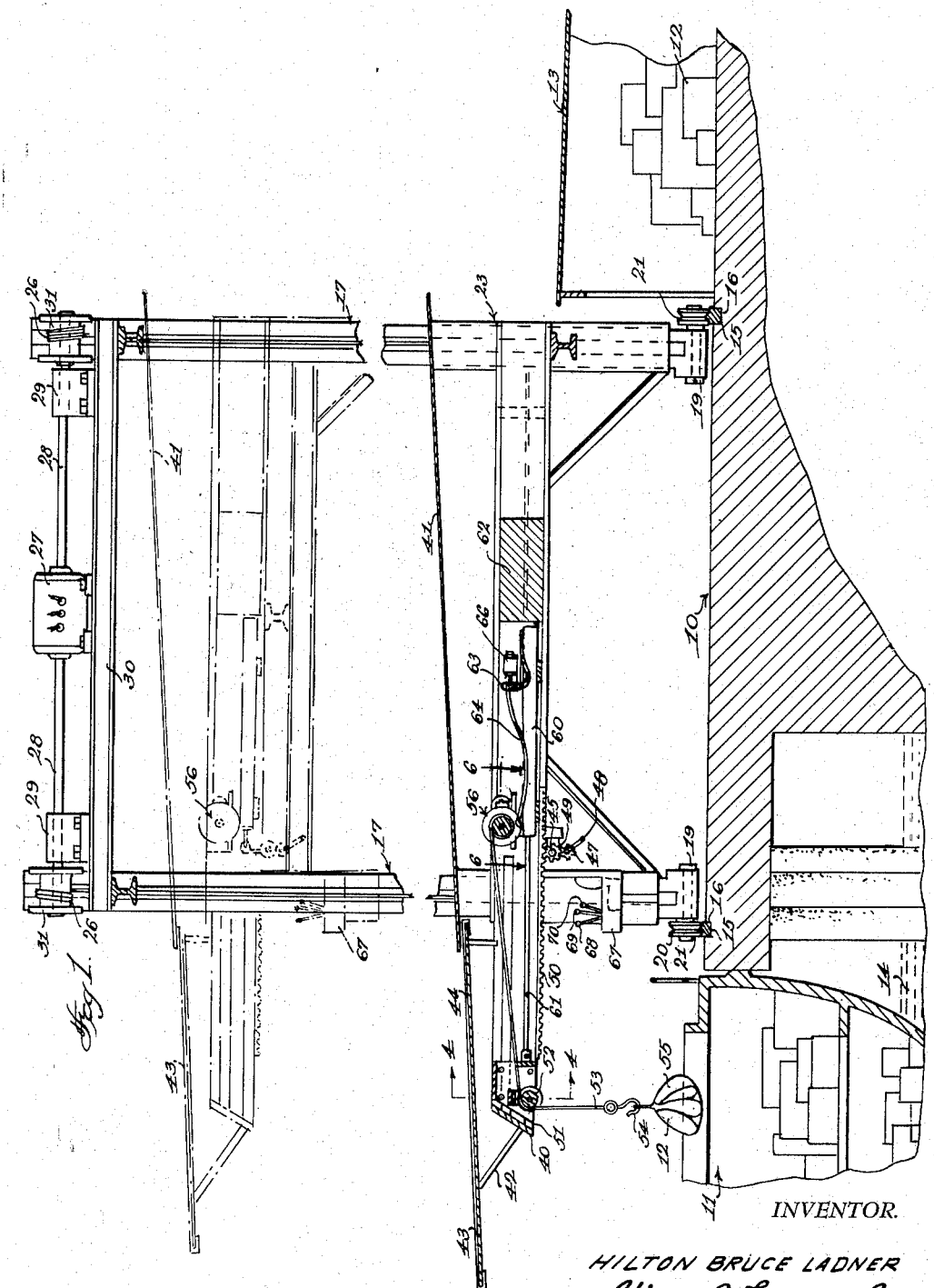
Figure 1 is a longitudinal sectional view taken through the cargo handling assembly of the present invention, and with parts broken away and in section.

Referring in detail to the drawings, the numeral 10 designates a portion of a pier or wharf which can be made of any suitable material such as concrete, and the numeral 11 designates a boat or ship which is being loaded or unloaded. The ship 11 may have cargo 12 therein, and the ship 11 may be positioned in the water 14, Figure 1. The numeral 13 designates one or more warehouses which are adapted to receive the cargo 12 therein.

The upper surface of the pier 10 is provided with recesses 16, and secured in these recesses 16 are spaced parallel rails or tracks 15.

Extending upwardly from the pier 10 are four vertically disposed spaced parallel beams 17, Figure 7. Each of the beams 17 is provided with a longitudinally extending groove or cutout 18, and extending through the lower end of each of the beams 17 is a trunnion or pin 19 which carries a wheel 20. Each of the wheels 20 is provided with an annular groove 21 which engages an upwardly extending rib 22 which projects upwardly from the rails 15. Due to the position of the wheels 20 and rails 15, the entire cargo handling assembly can be shifted along the rails by any suitable mechanism.

Slidably or reciprocably arranged on each of the beams 17 is a casing 23. Each of the casings 23 includes an inwardly projecting lug 24 which extends into the corresponding groove 18. A means is provided for adjusting the casings 23 simultaneously, and this means comprises guide pulleys 25 which are journaled in the upper ends of the beams 17, Figure 2. Cables 26 are trained over the pulleys 25, and the lower ends of the cables 26 are secured to the lugs 24. A motor 27 of conventional construction, is secured to a crosspiece 30, Figure 1, and the motor 27 serves to operate a drive shaft 28 which is supported by bearings 29. Drums or reels 31 are mounted on the ends of the shaft 28, and the drums 31 have the cables 26 trained thereover. Thus, when the motor 27 is actuated, the shaft 28 will rotate so that the cables 26 can be wound on or off the drums 31 to thereby raise or lower the casings 23 on the beams 17. It is to be noted that the motor 27 is of the reversible type so that the direction of rotation of the drums 31 can be controlled as desired.

Figure 4:
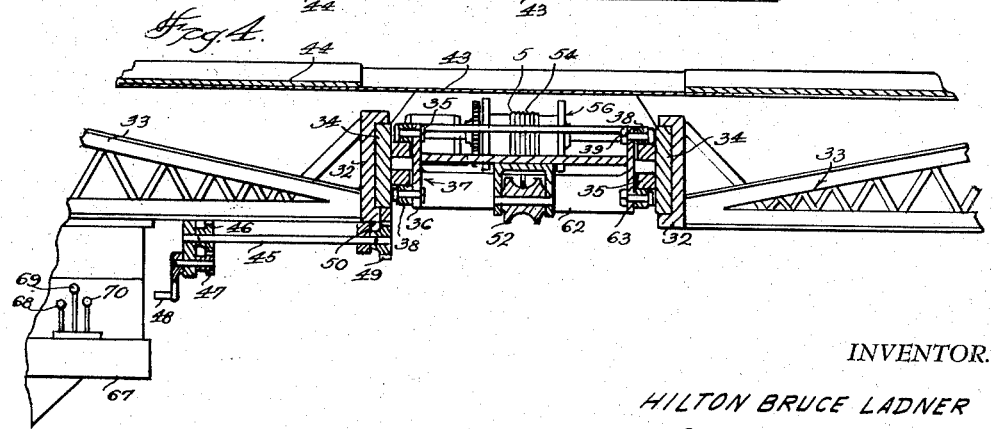
Figure 4 is a sectional view taken on the line 4—4 of Figure 1.

The assembly of the present invention further includes a pair of spaced parallel horizontally disposed stationary tracks 32, and extending from the tracks 32 are braces or trusses 33. A bar 34 is slidably arranged contiguous to the inner surface of each of the tracks 32, and secured to the inner surface of each of the bars 34 are straps 35. There is further provided a movable boom 37 which includes a pair of spaced parallel movable arms 36 which are arranged contiguous to the inner surface of the straps 35, Figure 4. Rollers 38 are journaled on the arms 36 by means of pins or bolt and nut assemblies 39, and the rollers 38 rotatably engage the straps 35.

A hood 40 is secured to the front ends of the bars 34, and the numeral 41 designates an inclined roof. The roof 41 can be adjusted vertically since the roof 41 is secured to the upper end of the plurality of casings 23. Thus, as the casings 23 are elevated or lowered by means of the motor 27, the roof 41 will move therewith. Braces 42 extend upwardly from the hood 40 and from the bars 34, and the braces 42 are secured to a roof member 43. A pair of extensible roof sections 44 are slidably connected to the central roof section 43, so that the roof sections 44 can be extended or retracted as desired in order to permit variation in the amount of area being protected or covered by the roof. Any suitable mechanism can be provided for sliding the roof sections 44 toward and away from each other.

The roof member 43 can be moved towards and away from the roof 41 by means of a manually operable mechanism. This manually operable mechanism comprises a stub shaft 45 which has a gear 46 thereon, and the gear 46 meshes with a gear 47 which is rotated by means of a manually operable crank 48, Figure 4. A gear 49 is also mounted on the shaft 45, and the gear 49 meshes with teeth 50 which are arranged on the lower surface of one of the bars 34. Thus, as the crank or handle 48 is turned, the shaft 45 will rotate and this in turn will cause reciprocation of the bars 34 in the tracks 32. As the bars 34 move, the hood 40 will move and therefore the roof sections 43 and 44 will be shifted.

For loading or unloading the ship 11, there is provided a hook 54 which is secured to the lower end of the cable 53, and the cable 53 is trained over a pulley or drum 52 which is journaled in a bracket 51. The bracket 51 is secured in the front end of the boom 37 between the arms 36 and a winch 56 and has the cable 53 arranged in engagement therewith whereby the cargo 55 can be raised or lowered. For controlling the winch 56, a motor 57 is arranged contiguous to the winch, and the motor 57 operates a gear member 58 which is arranged in meshing engagement with a gear member 59 that is secured to the winch 56, the motor 57 being of the reversible type. Carried by the boom 37 is a cylinder 60 which may be of the hydraulic type, and the cylinder 60 includes or has projecting forwardly therefrom a rod 61 which may be secured to the bracket 51. A counterweight 62 is integral with the boom for the purpose of counterbalancing the lift of the load.

There is further provided a pump 63 for controlling the circulation of hydraulic fluid and there is further provided conduits 64 and 65. A motor 66 is provided for operating the pump 63, Figure 5.

Secured to one of the casings 23 is a carriage or platform 67 which is adapted to provide a support for the operator of the apparatus. Levers 69 and 70 may be provided on the platform 67 so that the various motors can be controlled and these levers can be manually operated.

In the wiring diagram the numerals 71 and 72 designate the power input lines, and extending from the line 72 is a line 73, Figure 5. Wires 74, 75 and 76 may lead from a branch line which is connected to the power line 71, and the lines 74, 75 and 76 are connected each to a two-way switch which is operated by the manually actuated levers 68, 69 and 70. Wires 77 and 78 lead from one of the switches to the motor 27, there being a third line 79 connecting the line 73 to the motor 27. A pair of wires 80 and 81 lead from the intermediate switch which is controlled by the lever 69, to the motor 57, and a third line 82 leads from the motor 57 to the line 73. There is also provided a pair of lines 83 and 84 which lead from the other switch to the motor 66, and a line 85 leads from the motor 66 to the line 73. The beams 17 may have braces such as the braces 86 extending therebetween.

Figure 2:
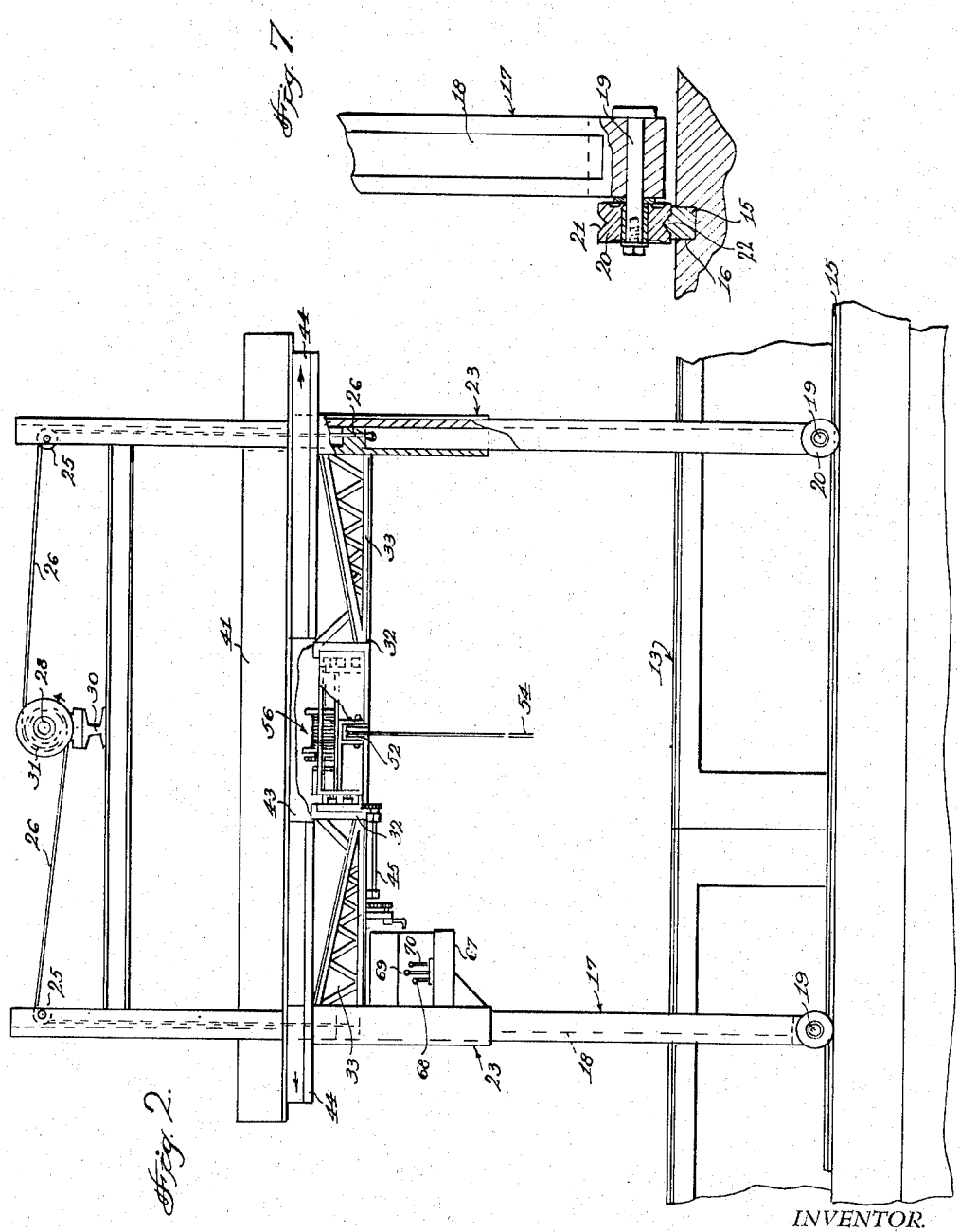
Figure 2 is a front elevational view of the cargo handling assembly, with parts broken away and in section, and showing the boom extended and the movable roof sections in their open positions.

In use, a ship such as the ship 11 to be loaded or unloaded with cargo such as the cargo 12 is docked alongside the pier 10 as shown in Figure 1. Warehouses or storage areas 13 may be provided rearwardly on the pier 10 and the cargo 12 may be contained in the usual sling 55. The hook 54 of the line 53 can be arranged in engagement with the sling 55 and then by actuating the motor 57, the sling 55 will be actuated to extend or retract the cable 53 so that the cargo 12 can be raised or lowered as desired. By actuating the motor 66, the pump 63 will be operated whereby hydraulic fluid or other operating medium will pass through the line 65 and 64 so that the rod 61 in the cylinder 60 will be extended or retracted. The sling 55 can be moved towards and away from the pier as for example when trucks or the like are to be loaded. Furthermore, by actuating the motor 27, the drums 31 will be rotated and this in turn will cause up and down movement of the casings 23 which cause similar movement of the roof 41 since the roof 41 is secured to the upper ends of the casings 23. Since the roof 41 can be raised or lowered, there will be provided ample space or clearance for trucks and the like beneath the roof. The outwardly extending roof section 43 has the pair of extensible members 44 slidably connected thereto so that the amount of protection offered by the roof can be varied as desired. Due to the provision of these roofs, there will be no damage to the cargo 12 or to personnel working in loading or unloading the cargo from inclement or adverse weather conditions such as rain or snow. The levers 68 and 70 can be actuated by means of an operator who may sit on the platform 67. The lever 68 will control the motor 66, the lever 69 will control the motor 57, and the lever 70 will control the motor 27 and these motors are all of the reversible type so that the parts can be moved in any desired direction.

Figure 3:
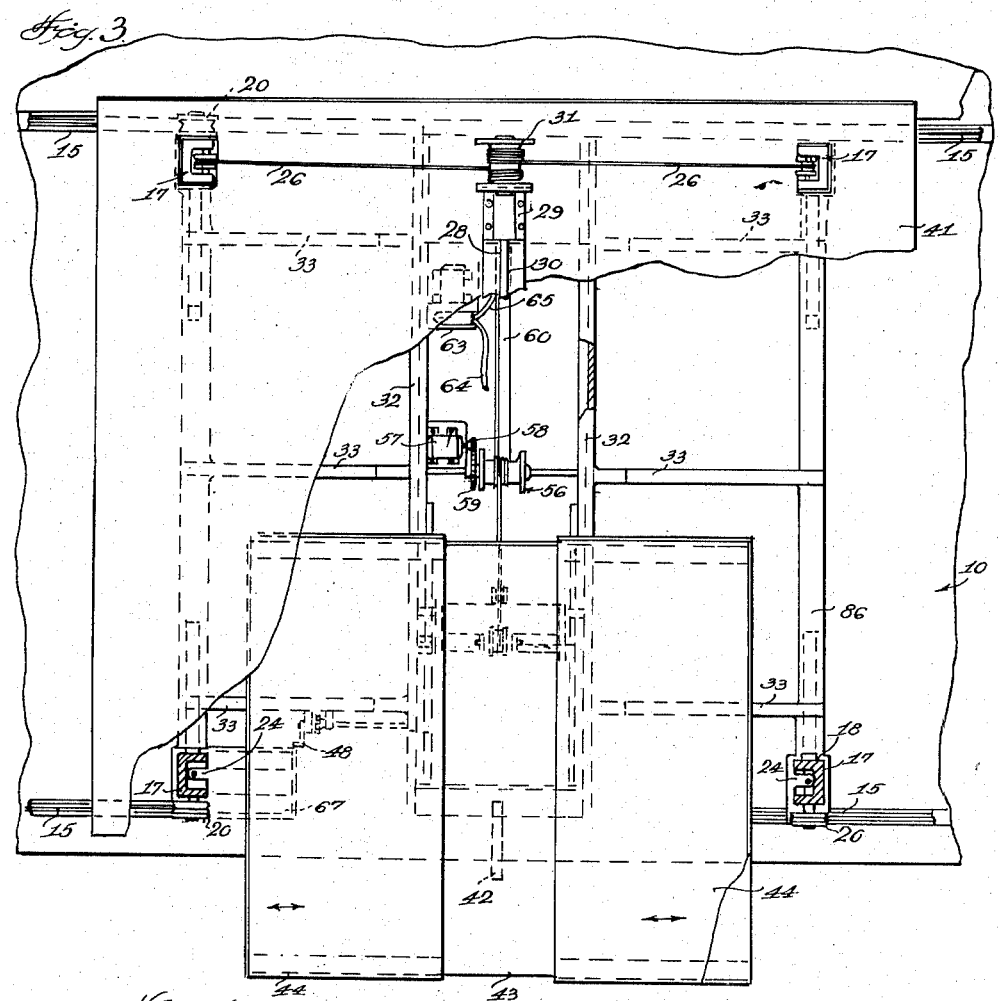
Figure 3 is a top plan view of the cargo handling apparatus, with parts broken away and in section, and showing the boom retracted, and the movable roof sections closed.

If desired, a light can be carried by the extended end of the boom for illuminating the various operations. The assembly can also be used for loading cargo of any type into or out of freight cars which may be brought up adjacent to the wharf or pier. With the present invention the work of loading and unloading ships cargoes can be carried on in rainy or other bad weather so that there will be no loss in man hours nor will there be money lost nor wasted by ships lying needlessly at docks. The cylinder 60 can be actuated by means of a pneumatic mechanism instead of the hydraulic mechanism if desired. Due to the fact that the various parts are adjustable, work can be performed on ships of various sizes or shapes. For example by moving the roof sections 44 inwardly as shown in Figure 3, short hatches can be worked which could not otherwise be worked where the roof width would not enter between the masts or superstructure. The present invention is especially suitable when cargoes which are perishable are being handled since such perishable cargoes will be protected from the weather. The operator on the platform 67 is raised and lowered with the roof 41, since the platform 67 is secured to one of the casings 23.

It is desired to emphasize that the important features of the present invention are the extendable roof and the piston operating carriage. The counterweight 62 serves to counterbalance the load lift and this weight is integral with the extendable boom. The movement of the wheels such as the wheels 20 along the rails 15 can be accomplished in any suitable manner as for example by means of an electric motor which is geared to the two wheels which face the vessel. Furthermore, the boom can be extended to proper position over the hatch of the vessel and left in that position during freight handling operations. The piston rod is connected to the carriage which operates on rails that are fixed on both sides of the boom. As previously described, the numeral 13 indicates the portion of the warehouse for storing the material 12. The present invention thus includes an extendable roof which makes it possible to work in inclement weather. A lifting winch is located on top of the boom so that the load lowers when the carriage is withdrawn. The counterweight serves to counterbalance the lift of the load and with the present invention cargoes and workmen are protected from the weather.

I claim:

1. In a cargo handling apparatus, a plurality of horizontally disposed rails, a plurality of vertically disposed spaced parallel beams, wheels journaled on the lower ends of said beams and engaging said rails, each of said beams being provided with a longitudinally extending groove, a vertically adjustable casing reciprocably mounted on each of said beams and including a lug on its lower end positioned in said groove, a first motor mounted adjacent the upper end of said beams, a drive shaft operated by said motor, a pair of drums mounted on the ends of said shaft, guide pulleys supported by the upper ends of said beams, cables trained over said drums and trained over said guide pulleys and extending through said grooves and secured to said lugs, an inclined roof member mounted for adjustable movement in a vertical plane and secured to the upper ends of said casings, a pair of spaced parallel horizontally disposed tracks mounted between said beams, a bar slidably mounted in each of said tracks, manually operable means for causing sliding movement of said bars in said tracks, a hood secured to the front ends of said pair of bars, a central roof portion supported above said bars, a pair of extensible roof sections slidably connected to said roof portion, straps secured to the inner surface of each of said bars, an extensible boom including a pair of spaced parallel horizontally disposed arms arranged contiguous to said straps, rollers journaled on said arms and engaging said straps, a bracket secured to the front end of said boom, a pulley wheel journaled in said bracket, a cable trained over said pulley wheel and having a hook on its lower end, a winch having said last named cable connected thereto, a motor for actuating said winch, a cylinder carried by said boom, and a rod reciprocably connected to said cylinder and connected to said bracket.

2. The structure as defined in claim 1, wherein said manually operable means comprises gear teeth on the bottom of one of said bars, a stub shaft positioned below said inclined roof and having a gear member thereon, and a handle for rotating said stub shaft.

3. The structure as defined in claim 1, and further including a platform secured to one of said casings and having control levers thereon.

4. The structure as defined in claim 1, and further including a pump for controlling passage of fluid to said cylinder, and a motor for controlling operation of said pump.

References Cited in the file of this patent

UNITED STATES PATENTS

| | | |
|---|---|---|
| 1,236,047 | Brown et al. | Aug. 7, 1917 |
| 1,780,322 | Tsuji | Nov. 4, 1930 |
| 1,991,652 | Bean | Feb. 19, 1935 |

FOREIGN PATENTS

| | | |
|---|---|---|
| 149,713 | Sweden | Apr. 19, 1955 |